(12) United States Patent
Zhang et al.

(10) Patent No.: US 11,877,103 B2
(45) Date of Patent: Jan. 16, 2024

(54) PROJECTION DEVICE AND PROJECTION PICTURE CORRECTION METHOD THEREOF

(71) Applicant: ALi Corporation, Hsinchu (TW)

(72) Inventors: Zhao-Dong Zhang, Guangdong (CN); Ben-Xiang Qu, Guangdong (CN); Lun Liang, Guangdong (CN)

(73) Assignee: ALi Corporation, Hsinchu (TW)

( * ) Notice: Subject to any disclaimer, the term of this patent is extended or adjusted under 35 U.S.C. 154(b) by 218 days.

(21) Appl. No.: 17/468,696

(22) Filed: Sep. 8, 2021

(65) Prior Publication Data

US 2022/0141435 A1 May 5, 2022

(30) Foreign Application Priority Data

Oct. 30, 2020 (CN) .......................... 202011191038.3

(51) Int. Cl.
  *H04N 9/31* (2006.01)
  *G06T 5/00* (2006.01)
  (Continued)

(52) U.S. Cl.
  CPC ........... *H04N 9/3188* (2013.01); *G06T 3/005* (2013.01); *G06T 3/0093* (2013.01); *G06T 3/40* (2013.01);
  (Continued)

(58) Field of Classification Search
  CPC .... H04N 9/3185; H04N 9/3188; G06T 5/006; G06T 3/005; G06T 3/00; G06T 7/13;
  (Continued)

(56) References Cited

U.S. PATENT DOCUMENTS 4,780,616 A  10/1988 Nishi et al.
7,441,906 B1 * 10/2008 Wang ..................... G03B 21/14
                                                   353/121
(Continued)

FOREIGN PATENT DOCUMENTS

CN    104079907    10/2014
CN    106657848    5/2017
(Continued)

OTHER PUBLICATIONS

"Office Action of China Counterpart Application", dated Jun. 30, 2023, p. 1-p. 8.

*Primary Examiner* — Ian L Lemieux
*Assistant Examiner* — Woo C Rhim
(74) *Attorney, Agent, or Firm* — JCIPRNET

(57) ABSTRACT

A projection device and a projection picture correction method thereof are provided. When the projection device performs projection toward a projection surface, a plurality of target coordinates of a plurality of target vertexes are obtained based on a plurality of planes of the projection surface. The plurality of planes are not coplanar with each other, and the plurality of target vertexes form a target polygon. A first direction scaling process is performed respectively on a plurality of first image portions of an original trapezoidal image and a trapezoidal image block is generated. A second direction scaling process is performed respectively on a plurality of second image portions of the trapezoidal image block and a target image block aligned with the target polygon is generated. An output image including the target image block is projected onto the projection surface.

10 Claims, 8 Drawing Sheets

(51) Int. Cl.
*G06T 3/00* (2006.01)
*G06T 3/40* (2006.01)
*G06T 7/13* (2017.01)

(52) U.S. Cl.
CPC ............... *G06T 5/006* (2013.01); *G06T 7/13* (2017.01); *H04N 9/3185* (2013.01); *G06T 2207/20112* (2013.01)

(58) Field of Classification Search
CPC ............ G06T 3/0093; G06T 3/40; G06T 2207/20112; G03B 21/147; G03B 21/142; G03B 21/14; G03B 21/005; G06V 10/243
See application file for complete search history.

(56) References Cited

U.S. PATENT DOCUMENTS

| | | | |
|---|---|---|---|
| 9,654,749 B2 | 5/2017 | Zhang et al. | |
| 2003/0098957 A1* | 5/2003 | Haldiman | G03B 21/005 353/69 |
| 2003/0222892 A1* | 12/2003 | Diamond | H04N 9/31 345/647 |
| 2008/0012879 A1 | 1/2008 | Clodfelter | |
| 2009/0231551 A1* | 9/2009 | Franik | H04N 9/3185 353/69 |
| 2011/0164226 A1 | 7/2011 | Wu et al. | |
| 2012/0212627 A1* | 8/2012 | Klose | H04N 9/3185 348/189 |
| 2014/0247287 A1* | 9/2014 | Saigo | H04N 9/3182 345/682 |
| 2014/0293133 A1* | 10/2014 | Saigo | H04N 9/3179 348/607 |
| 2015/0042684 A1* | 2/2015 | Zhang | G06T 7/181 345/647 |
| 2015/0146104 A1* | 5/2015 | Saigo | H04N 9/3179 348/607 |
| 2020/0413014 A1* | 12/2020 | Tanaka | H04N 9/3194 |
| 2022/0132071 A1* | 4/2022 | Tanaka | G03B 21/142 |
| 2022/0141434 A1* | 5/2022 | Qu | G06T 7/60 348/745 |
| 2022/0141436 A1* | 5/2022 | Liang | G06T 5/006 353/69 |
| 2022/0247983 A1* | 8/2022 | Gao | G06T 7/60 |

FOREIGN PATENT DOCUMENTS

| | | | |
|---|---|---|---|
| CN | 106657848 A | * | 5/2017 |
| CN | 108377371 | | 8/2018 |
| JP | 2005326247 A | * | 11/2005 |
| JP | 2015139087 A | * | 7/2015 |
| JP | 2020061662 A | * | 4/2020 |

* cited by examiner

PROJECTION DEVICE AND PROJECTION PICTURE CORRECTION METHOD THEREOF

CROSS-REFERENCE TO RELATED APPLICATION

This application claims the priority benefit of Chinese application no. 202011191038.3, filed on Oct. 30, 2020. The entirety of the above-mentioned patent application is hereby incorporated by reference herein and made a part of this specification.

BACKGROUND

Technical Field

The disclosure relates to a projection technology; particularly, the disclosure relates to a projection device and a projection picture correction method thereof.

Description of Related Art

As technology advances, various projection devices have been widely applied in various occasions, such as presentations, speeches, theaters, audio-visual teaching, interactive teaching, home theater systems, etc. The projection device is a display device configured to generate projection pictures. In the imaging of the projection device, an illumination light beam generated by an illumination system is converted into an image light beam through an imaging device, and then the image light beam is projected onto a projection surface or a wall through a projection lens to form a projection picture.

Notably, when an optical axis of the projection device lens is not perpendicular to the projection surface or the wall, keystone distortion will be present in the projection picture on the projection surface or the wall, which reduces the projection quality. That is to say, in the arrangement of the projection device, the optical axis of the lens is required to be perpendicular to the projection surface, so that distortion will not be present in the projection picture when projected. The user may manually adjust the position and manner of arrangement of the projection device, but the projection picture may be subject to environmental restrictions and thus is not adjusted to the ideal state. In view of the above, before projection by the projection device, image pre-deformation may be performed by an internal image processing chip of the projection device to realize keystone correction. However, when the projection surface is nonplanar, or when the projection surface is formed with a plurality of planes that are not coplanar, the conventional keystone correction still cannot alleviate the distortion or deformation of the projection picture.

SUMMARY

In view of the above, the disclosure provides a projection device and a projection picture correction method thereof, which may alleviate the presence of content distortion in a projection picture on a nonplanar projection surface, thereby improving the projection quality.

An embodiment of the disclosure provides a projection picture correction method, which is adapted for projection devices. The method includes the following steps. When a projection device performs projection toward the projection surface, a plurality of target coordinates of a plurality of target vertexes is obtained based on a plurality of planes of a projection surface. Herein the plurality of planes are not coplanar with each other, and the plurality of target vertexes form a target polygon. Then, a first direction scaling process is performed respectively on a plurality of first image portions of an original rectangular image and a trapezoidal image block is generated. Next, a second direction scaling process is performed respectively on a plurality of second image portions of the trapezoidal image block and a target image block aligned with the target polygon is generated. Also, an output image comprising the target image block is projected onto the projection surface.

An embodiment of the disclosure provides a projection device, which includes an image processing circuit and a projection module. The image processing circuit is configured to perform the following steps. When a projection device performs projection toward the projection surface, a plurality of target coordinates of a plurality of target vertexes is obtained based on a plurality of planes of a projection surface. Herein the plurality of planes are not coplanar with each other, and the plurality of target vertexes form a target polygon. Then, a first direction scaling process is performed respectively on a plurality of first image portions of an original rectangular image and a trapezoidal image block is generated. Next, a second direction scaling process is performed respectively on a plurality of second image portions of the trapezoidal image block and a target image block aligned with the target polygon is generated. Also, an output image comprising the target image block is projected onto the projection surface.

Based on the foregoing, in the embodiments of the disclosure, when the projection device performs projection toward the projection surface having a ridgeline or a valley line, the horizontal and vertical image scaling processes may be performed corresponding to the geometric structure of the projection surface, and the target image block generated from the image scaling process is projected onto the projection surface. Accordingly, the distortion or deformation of the projection picture on the nonplanar projection surface may be prevented, thereby improving the quality of the projection picture.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
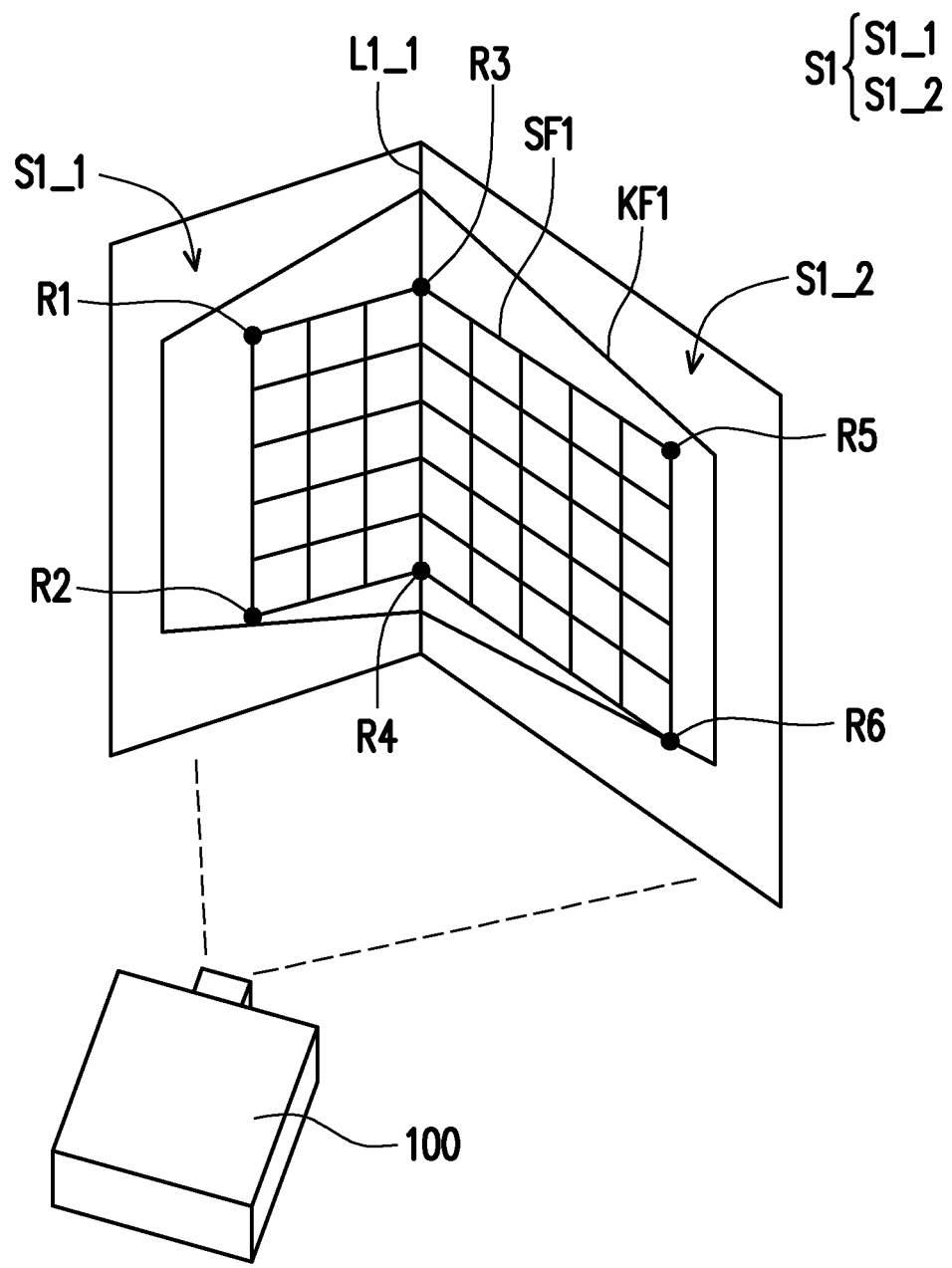
FIG. 1A is a schematic diagram of a projection device performing projection according to an embodiment of the disclosure.

Reference will now be made in detail to exemplary embodiments provided in the disclosure, examples of which are illustrated in the accompanying drawings. Wherever possible, the same reference numerals will be used in the drawings and description to refer to the same or similar parts.

Figure 1B:
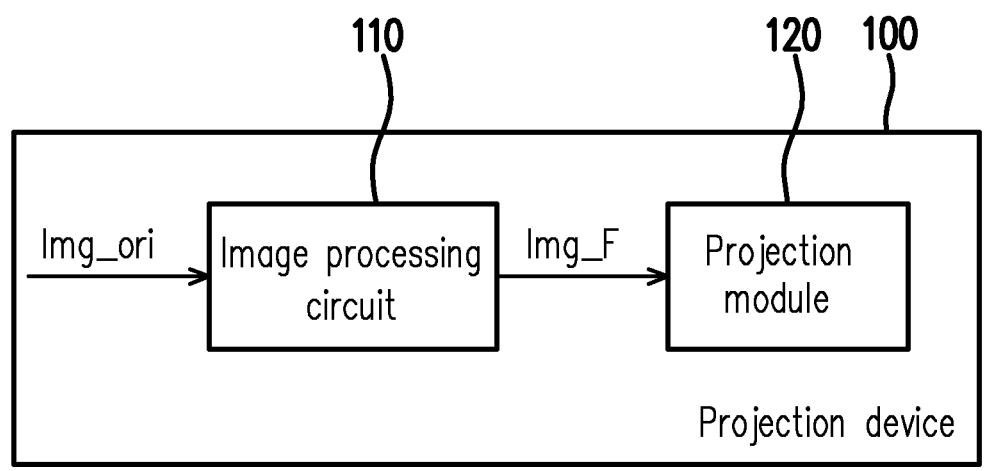
FIG. 1B is a schematic diagram of a projection device according to an embodiment of the disclosure.

FIG. 1A is a schematic diagram of a projection device performing projection according to an embodiment of the disclosure. FIG. 1B is a schematic diagram of a projection device according to an embodiment of the disclosure. With reference to FIG. 1A and FIG. 1B, a projection device 100 projects an image on a projection surface S1. The projection device 100 may be a liquid crystal projector (LCP), a digital light processing (DLP) projector, a reflective liquid crystal on silicon (LCOS) projection display apparatus, or the like. In this embodiment, the projection device 100 may include an image processing circuit 110 and a projection module 120. The projection module 120 may include a light source module, an optical engine module, a lens module, and related optical and circuit control components. The projection device 100 may receive an original rectangular image Img_ori through a data transmission interface, the image processing circuit 110 is configured to perform image pre-deformation on the original rectangular image Img_ori, and then the projection module 120 projects an output image Img_F generated from the image pre-deformation onto the projection surface S1.

Figure 1C:
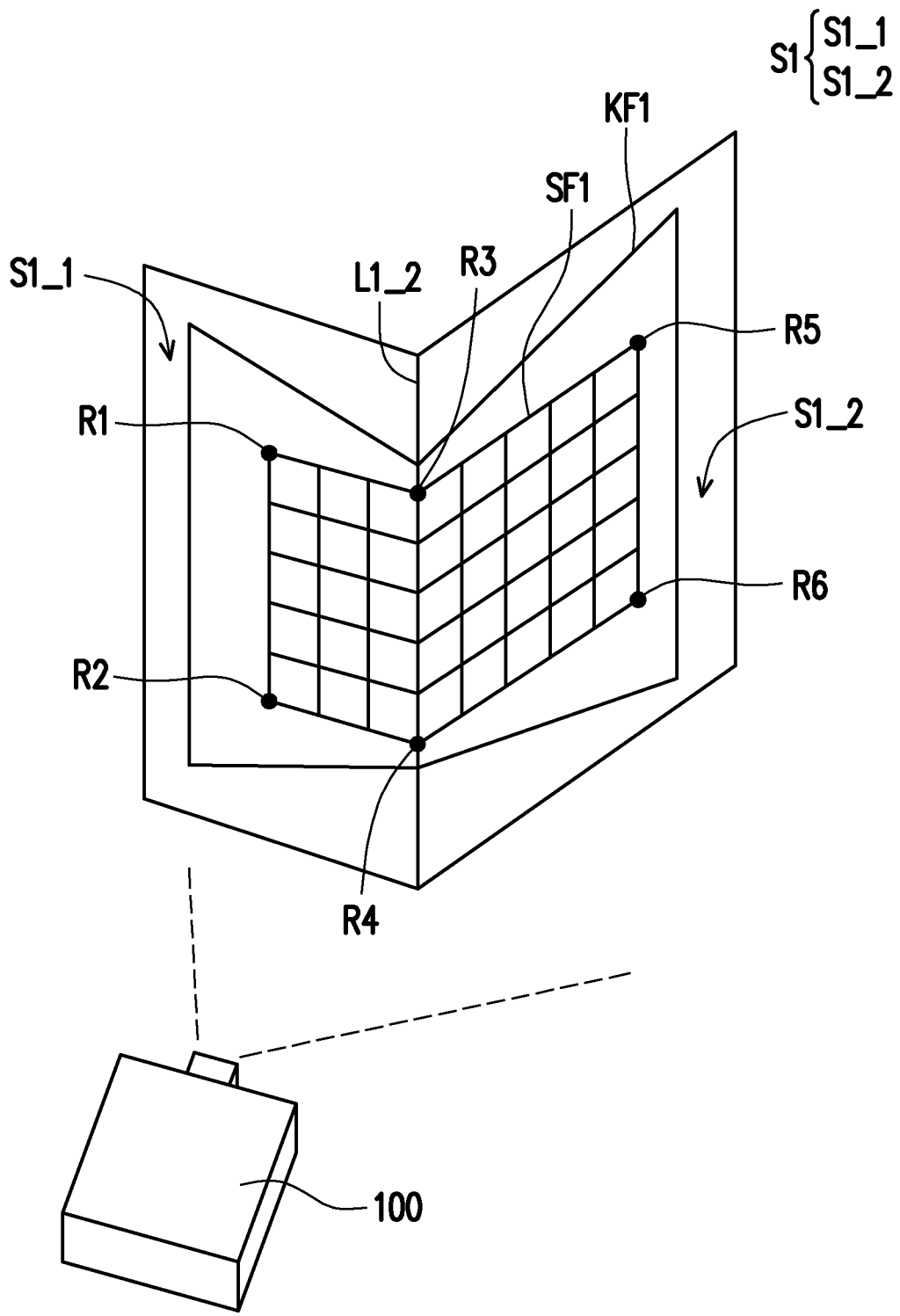
FIG. 1C is a schematic diagram of a projection device performing projection according to an embodiment of the disclosure.

In an embodiment, the projection surface S1 includes a plurality of planes S1_1 and S1_2, and the plurality of planes S1_1 and S1_2 are not coplanar with each other. In the example of FIG. 1A, the planes S1_1 and S1_2 are connected to each other in a valley line L1_1 on the projection surface S1. FIG. 1C is a schematic diagram of a projection device performing projection according to an embodiment of the disclosure. As shown in FIG. 1C, in an embodiment, the planes S1_1 and S1_2 may be connected in a ridgeline L1_2 on the projection surface S1. When the projection device 100 performs projection, a portion of the projection picture is displayed on the plane S1_1, and the other portion of the projection picture is displayed on the other plane S1_2. For example, when the projection device 100 performs projection toward a wall corner, the planes S1_1 and S1_2 are different wall surfaces, and an angle smaller than 180 degrees may be present between the planes S1_1 and S1_2 bordered at the valley line L1_1. In a general interior space, the angle may be, for example, 90 degrees. Notably, two planes S1_1 and S1_2 are adopted to exemplify FIG. 1A and the subsequent description, but the disclosure is not limited thereto. Furthermore, the disclosure does not limit the number of surfaces of the projection surface and the angle between adjacent surfaces.

It can be know that when the projection device 100 has not performed any image pre-deformation, since an optical axis of the lens of the projection device 100 is not perpendicular to the planes S1_1 and S1_2, content distortion is present in a projection picture KF1 on the projection surface S1. Based on the above, in the embodiments of the disclosure, to alleviate the content distortion, the image processing circuit 110 may perform image pre-deformation on the original rectangular image Img_ori, so that the projection device 100 projects a projection picture SF1 without content distortion on the planes S1_1 and S1_2 of the projection surface S1. The image processing circuit 110 realizes the image pre-deformation through a horizontal scaling process and a vertical scaling process. To be more specific, according to coordinate information of positioning points R1-R6, the image processing circuit 110 may perform the image scaling process on the original rectangular image Img_ori and generate the output image Img_F. Therefore, when the projection module 120 projects the output image Img_F generated from the image scaling process, the projection picture SF1 that is corrected may be displayed on the projection surface S1.

In an embodiment, the positioning points R1-R6 on the projection surface S1 may be marked by the user. More specifically, the projection device 100 may perform projection in the absence of image pre-deformation, and then the user may mark the positioning points R1-R6 within the picture range of the projection picture KF1 through an input device (e.g., a remote control or a button on the projection device 100). Alternatively, in an embodiment, the positioning points R1-R6 on the projection surface S1 may be determined based on sensing data of a distance sensor or an image sensor of the projection device 100 itself. Based on the positioning points R1-R6 on the projection surface S1, the projection device 100 may obtain the target image from the original rectangular image Img_ori after pre-deformation according to the perspective transformation relationship, and perform the image scaling process on the original rectangular image Img_ori based on the target image.

Figure 2:
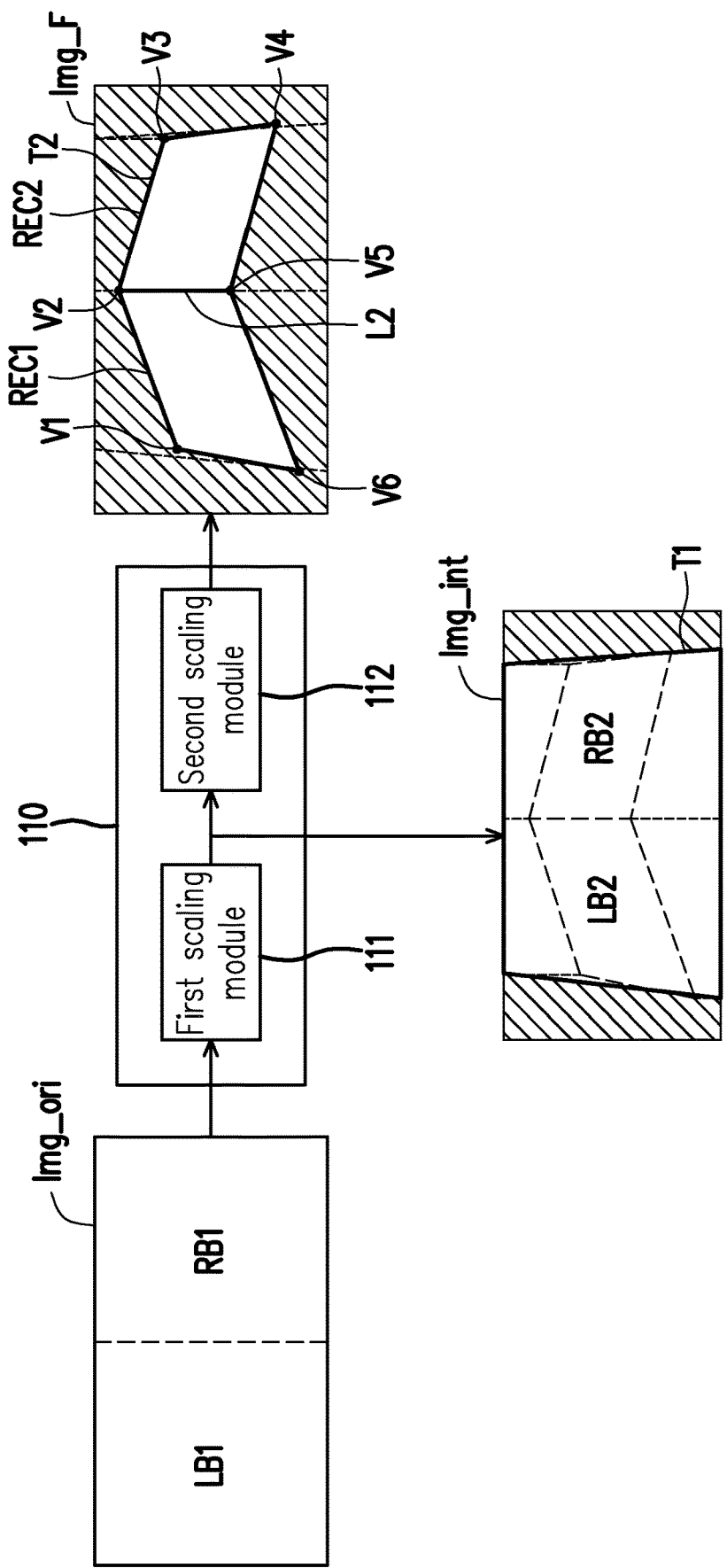
FIG. 2 is a schematic diagram of the image processing circuit performing image pre-deformation according to an embodiment of the disclosure.

FIG. 2 is a schematic diagram of the image processing circuit performing image pre-deformation according to an embodiment of the disclosure. With reference to FIG. 2, in an embodiment, after the positioning points R1-R6 on the projection surface S1 are determined, the image processing circuit 110 may obtain a plurality of target coordinates of a plurality of target vertexes V1-V6 corresponding to the positioning points R1-R6. To be more specific, the image processing circuit 110 may obtain the plurality of target coordinates of the plurality of target vertexes V1-V6 in the projection image coordinate system according to the coordinate information of the positioning points R1-R6 and the perspective transformation relationship. The plurality of target vertexes V1-V6 form a target polygon. In this way, through first reducing the original rectangular image Img_ori to a target image block aligned with the target polygon, the projection device 100 may subsequently project the projection picture SF1 without content distortion.

As shown in FIG. 2, the image processing circuit 110 may include a first scaling module 111 and a second scaling module 112. In this embodiment, the first scaling module 111 may perform a first scaling process associated with a first direction on the original rectangular image Img_ori and generate an intermediate image Img_int including a trapezoidal image block T1. The second scaling module 112 may perform a second scaling process associated with a second direction on the intermediate image Img_int and generate the output image Img_F including a target image block T2. The first direction is perpendicular to the second direction. That is, if the first direction is the vertical direction, the second direction is the horizontal direction. If the first direction is the horizontal direction, the second direction is the vertical direction. In the embodiment of FIG. 2, the first scaling module 111 performs the horizontal scaling process, and the second scaling module 112 performs the vertical scaling process. However, the sequence of the horizontal scaling process and the vertical scaling process is not limited by the disclosure. In other embodiments, it is possible that the first scaling module 111 first performs the vertical scaling process, and then the second scaling module 112 performs the horizontal scaling process. Notably, in an embodiment, the horizontal reduction ratio and the vertical reduction ratio corresponding to different pixel columns or pixel rows are not fixed values.

In the embodiment of FIG. 2, the first scaling module 111 performs the first direction scaling process (i.e., the horizontal scaling process) respectively on a plurality of first image portions LB1 and RB1 of the original rectangular image Img_ori, and generates the trapezoidal image block T1 of the intermediate image Img_int. Specifically, the first scaling module 111 adopts a pixel in the first image portion LB1 as an input pixel, generates an output pixel after performing the horizontal scaling process, and obtains a second image portion LB2. Similarly, the first scaling module 111 adopts a pixel in the first image portion RB1 as an input pixel, generates an output pixel after performing the horizontal scaling process, and obtains a second image portion RB2.

Next, the second scaling module 112 performs the second direction scaling process (i.e., the vertical scaling process) respectively on the plurality of second image portions LB2 and RB2 of the trapezoidal image block T1, and generates the target image block T2 that is aligned with the target polygon. In this way, compared with directly performing perspective transformation on the original rectangular image Img_ori to generate the output image, the embodiment of the disclosure may realize image pre-deformation through the image scaling process to greatly reduce the computational complexity. In addition, the image scaling process is also adapted to be realized by a hardware logic circuit.

Notably, in an embodiment, the target polygon formed with the target vertexes may include at least two target quadrilaterals, and the two target quadrilaterals intersect in an intersecting line. When the projection device 100 projects the output image, the intersecting line overlaps the ridgeline or the valley line on the projection surface.

For example, in the embodiment of FIG. 2, the target polygon formed with the target vertexes V1-V6 includes at least two target quadrilaterals REC1 and REC2, and the two target quadrilaterals REC1 and REC2 intersect in an intersecting line L2. When the projection device 100 projects the output image Img_F, the intersecting line L2 is overlapped with the valley line L1_1 on the projection surface S1. Similarly, in other embodiments where a ridgeline is present on the projection surface, when the projection device 100 projects the output image, the intersecting line between the two target quadrilaterals of the target polygon is overlapped with the ridgeline on the projection surface. That is, positions of two of the target vertexes (e.g., the target vertexes V2 and V5 of FIG. 2) are determined based on the ridgeline or the valley line on the projection surface. The ridgeline or the valley line (the valley line L1_1 as an example in FIG. 1) on the projection surface S1 divides the projection surface S1 into the plurality of planes S1_1 and S1_2 that are not coplanar.

Notably, in an embodiment, whenever the vertical scaling process or the horizontal scaling process is completed, the first scaling module 111 and the second scaling module 112 both fill a background block around the reduced image block to generate an image that conforms to a predetermined image size. As shown in the example of FIG. 2, after performing the first scaling process on the original image Img_ori, the first scaling module 111 will fill the background block on two sides of the trapezoidal image block T1 and generates the intermediate image Img_int. After performing the second scaling process on the intermediate image Img_int, the second scaling module 112 will fill the background block around the target image block T2 and generates the output image Img_F. The output image Img_F includes the target image block T2 and the background block surrounding the target image block T2. The projection device 100 projects the target image block T2 and the background block onto the projection plane S1. In an embodiment, the background block may be a black block. In other embodiments, the background block may also be of other colors, which is not limited by the disclosure. Based on the above, when the projection module 120 of the projection device 100 projects the output image Img_F onto the projection surface S1, the background block of the output image Img_F will not exhibits any content. Therefore, when the projection module 120 of the projection device 100 projects the output image Img_F onto the planes S1_1 and S1_2 of the projection surface S1, the projection picture SF1 without content distortion may be displayed on the projection surface S1.

Figure 3:
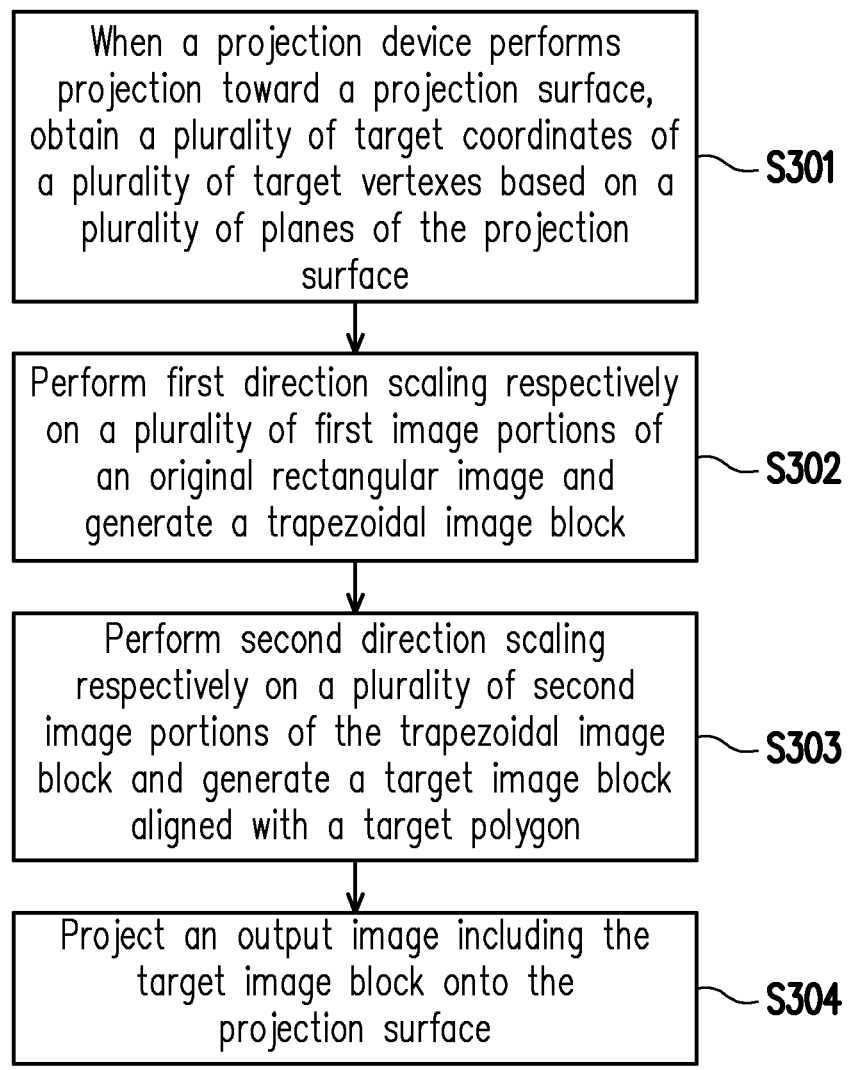
FIG. 3 is a flowchart of the projection picture correction method according to an embodiment of the disclosure.

Embodiments will be provided hereinafter to specifically describe the implementation detail of the image processing circuit 110 performing the image scaling process. Reference may be made to FIG. 3. FIG. 3 is a flowchart of the projection picture correction method according to an embodiment of the disclosure. The method workflow of FIG. 3 may be realized by the projection device 100 of FIG. 1B. For a clear and detailed explanation, the projection surface S1 as shown in FIG. 1A will continue to be taken as an example for further description hereinafter. Nonetheless, the disclosure is not limited thereto.

First, in step S301, when the projection device 100 performs projection toward the projection surface S1, the image processing circuit 110 obtains the plurality of target coordinates of the plurality of target vertexes (e.g., the target vertexes V1-V6 as shown in FIG. 2) based on the plurality of planes S1_1 and S1_2 of the projection surface S1. Herein, the plurality of planes S1_1 and S1_2 are not coplanar with each other, and the plurality of target vertexes form the target polygon.

In step S302, the image processing circuit 110 performs the first direction scaling process respectively on the plurality of first image portions of the original rectangular image Img_ori and generates the trapezoidal image block. Next, in step S303, the image processing circuit 110 performs the second direction scaling process respectively on the plurality of second image portions of the trapezoidal image block and generates the target image block aligned with the target polygon. Specifically, during the image scaling process, the reduction ratio and the input pixel corresponding to the output pixel in each column or each row are determined based on the target vertexes. In other words, the size, the shape, and the image content of the trapezoidal image block and the target image block are determined based on each target coordinate.

Figure 4A:
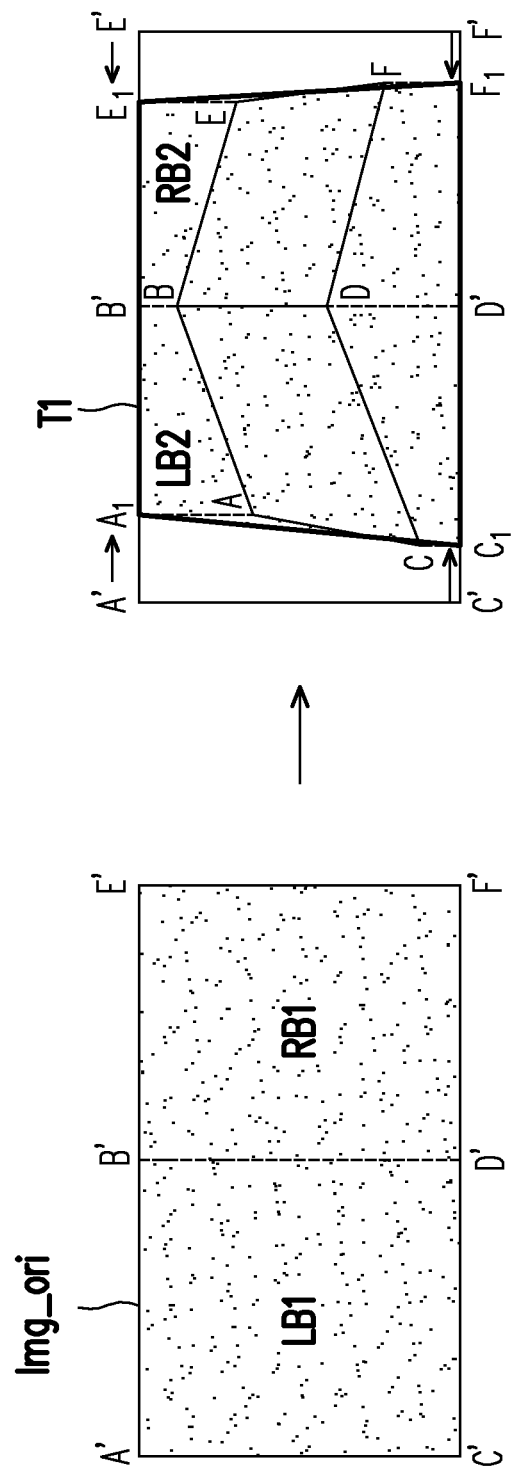
FIG. 4A is a schematic diagram of the horizontal scaling process according to an embodiment of the disclosure.
Figure 4B:
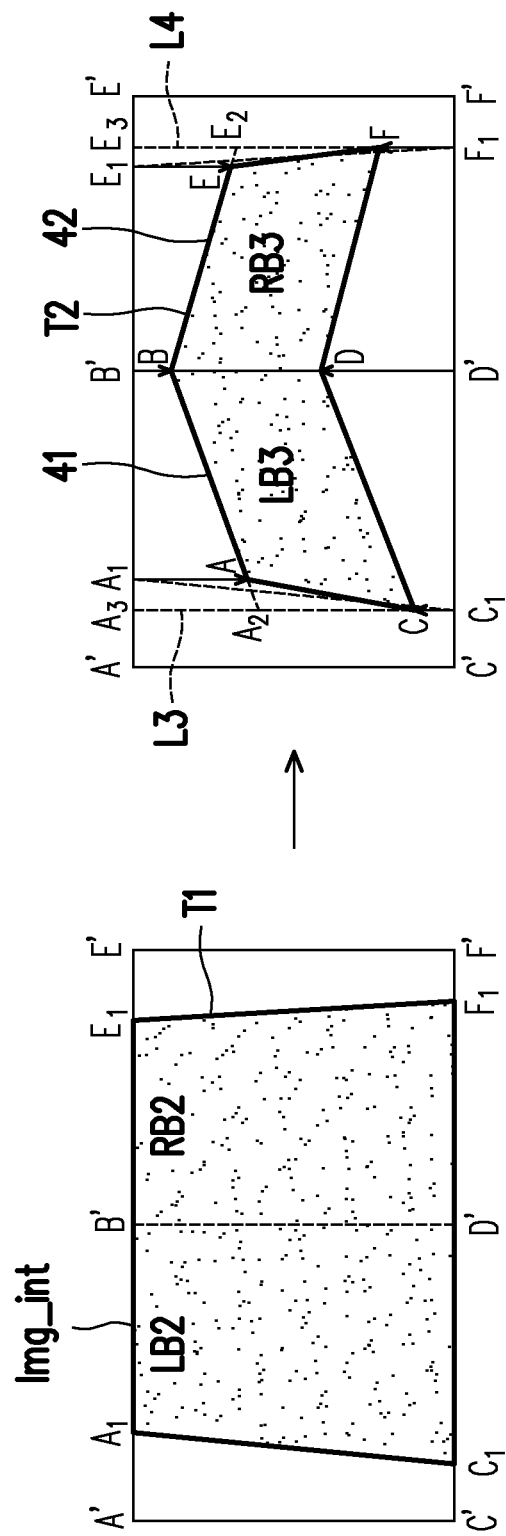
FIG. 4B is a schematic diagram of the vertical scaling process according to an embodiment of the disclosure.

Herein, it is taken as an example that the first direction scaling process is a horizontal scaling process and the second direction scaling process is a vertical scaling process for the description, but the disclosure is not limited thereto. FIG. 4A is a schematic diagram of the horizontal scaling process according to an embodiment of the disclosure. FIG. 4B is a schematic diagram of the vertical scaling process according to an embodiment of the disclosure.

In an embodiment, during the horizontal scaling process, the image processing circuit 110 first determines a plurality of trapezoidal boundaries according to the target coordinates, and then performs the horizontal scaling process on the original rectangular image according to the trapezoidal boundaries, thereby generating the trapezoidal image block formed with a plurality of sub-image blocks. With reference to FIG. 4A, the image processing circuit 110 may obtain a plurality of first trapezoidal boundaries $A_1B'D'C_1$ and $B'E_1F_1D'$ respectively corresponding to the plurality of first image portions LB1 and RB1 according to a predetermined image boundary A'E'F'C' and a first coordinate component (i.e., an X component) of each of a plurality of target coordinates A, B, C, D, E, and F. Herein, the image processing circuit 110 may find coordinates $A_1$, B', $C_1$, D', $E_1$, and $F_1$ on a long edge of the predetermined image boundary A'E'F'C' according to the X components of the target coordinates A, B, C, D, E, and F. The X components of the target coordinates A, B, C, D, E, and F are respectively the same as X components of the coordinates $A_1$, B', $C_1$, D', $E_1$, and $F_1$.

Next, the image processing circuit 110 performs the horizontal scaling process (i.e., the first direction scaling process) on the plurality of first image portions LB1 and RB1 of the original rectangular image Img_ori respectively according to the plurality of first trapezoidal boundaries $A_1B'D'C_1$ and $B'E_1F_1D'$ to generate the plurality of second image portions LB2 and RB2. For example, the image processing circuit 110 performs the horizontal scaling process on the first image portion LB1 according to the first trapezoidal boundary $A_1B'D'C_1$ to generate the second image portion LB2. The image processing circuit 110 performs the horizontal scaling process on the first image portion RB1 according to the first trapezoidal boundary $B'E_1F_1D'$ to generate the second image portion RB2. The trapezoidal image block T1 includes the plurality of second image portions LB2 and RB2. In this way, the image processing circuit 110 may first generate the trapezoidal image block T1 through the horizontal scaling process.

In an embodiment, during the vertical scaling process, the image processing circuit 110 similarly first determines the plurality of trapezoidal boundaries according to the target coordinates, and then performs the vertical scaling process on the image block including the second image portion of the trapezoidal image block according to the trapezoidal boundaries, thereby generating the target image block formed with a plurality of sub-target image blocks. With reference to FIG. 4B, the image processing circuit 110 may respectively extend two edges 41 and 42 of the target polygon until they intersect two reference line segments L3 and L4 and obtains two second trapezoidal boundaries $A_2CDB$ and $BDFE_2$, where a bottom edge of the trapezoidal image block T1 is perpendicular to bottom edges of the two second trapezoidal boundaries $A_2CDB$ and $BDFE_2$. In this embodiment, the bottom edge of the trapezoidal image block T1 is along the horizontal direction, and the bottom edges of the second trapezoidal boundaries $A_2CDB$ and $BDFE_2$ are along the vertical direction. Herein, the image processing circuit 110 extends the two edges 41 and 42 of different target quadrilaterals forming the target polygon ABEFDC. Moreover, the reference line segments L3 and L4 are vertical lines generated according to the X components of the target coordinates C and F, and the reference line segments L3 and L4 intersect a predetermined image boundary A'E' at the coordinates $A_3$ and $E_3$.

Then, the image processing circuit 110 may perform the vertical scaling process (i.e., the second direction scaling process) on the plurality of second image portions LB2 and RB2 respectively according to the two second trapezoidal boundaries $A_2CDB$ and $BDFE_2$ to generate two sub-target image blocks LB3 and RB3. The target image block T2 includes the two sub-target image blocks LB3 and RB3. In an embodiment, the image processing circuit 110 may reduce two image blocks (i.e., pixel sets within boundaries $A_3C_1D'B'$ and $E_3F_1D'B'$) including the second image portions LB2 and RB2 in the vertical direction according to the two second trapezoidal boundaries $A_2CDB$ and $BDFE_2$ to generate the sub-target image blocks LB3 and RB3 of the target image block T2. In this way, the image processing circuit 110 may generate the target image block T2 through the vertical scaling process. It can be accordingly know that the original rectangular image Img_ori is reduced and deformed into the target image block T2, and the image processing circuit 110 then fills the background block around the target image block T2 and generates the output image Img_F.

Besides, based on the teaching of FIG. 4A and FIG. 4B, when the ridgeline or the valley line on the projection surface divides the projection picture into a plurality of sub-pictures in the left-right direction, the projection device 100 may first perform the horizontal scaling process and then perform the vertical scaling process to realize image pre-deformation. Similarly, when the ridgeline or the valley line on the projection surface divides the projection picture into a plurality of sub-pictures in the up-down direction, the implementation of first performing the vertical scaling process and then performing the horizontal scaling process may be derived by people having ordinary skill in the art from the foregoing description.

Finally, in step S304, the projection module 120 projects the output image Img_F including the target image block onto the projection surface S1. That is, through the vertical scaling process and the horizontal scaling process, the projection device 100 may correct the projection picture on the projection surface where the ridgeline or the valley line is present, so that the projection content is not distorted. However, the pixel interpolation algorithm of the horizontal scaling process and the vertical scaling process is not limited by the disclosure, and may be configured depending on actual applications.

Notably, in FIG. 4A and FIG. 4B, the case where a connection line of B'D' overlaps a connection line of BD is adopted as a preferable example for description, but the disclosure is not limited thereto. In other embodiments, it is possible that the connection line of B'D' does not overlap the connection line of BD. For example, the connection line of B'D' may be located on the left side or the right side of the connection line of BD. In the case where the connection line of B'D' does not overlap the connection line of BD, subsequent the vertical scaling process requires to be adjusted accordingly to transform the original image into a polygonal image conforming to the target polygon.

It should also be noted that in the embodiment of FIG. 4A and FIG. 4B, the intersecting line between the two target quadrilaterals forming the target polygon are along the vertical direction, and therefore the vertical scaling process is performed in two stages on the two image blocks. However, in other embodiments, when the intersecting line between the two target quadrilaterals forming the target polygon is inclined, the vertical scaling process is performed in three stages on three image blocks.

Figure 5A:
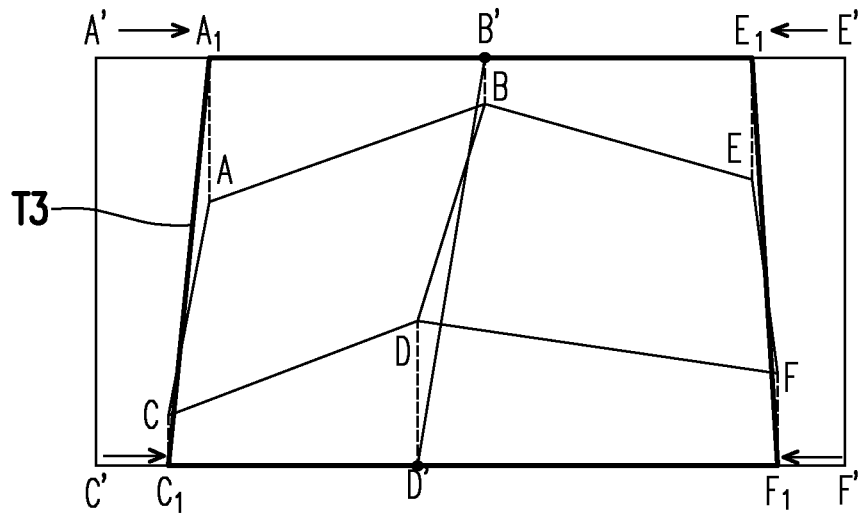
FIG. 5A is a schematic diagram of the horizontal scaling process performed when an intersecting line is not along the vertical direction and the horizontal direction according to an embodiment of the disclosure.
Figure 5B:
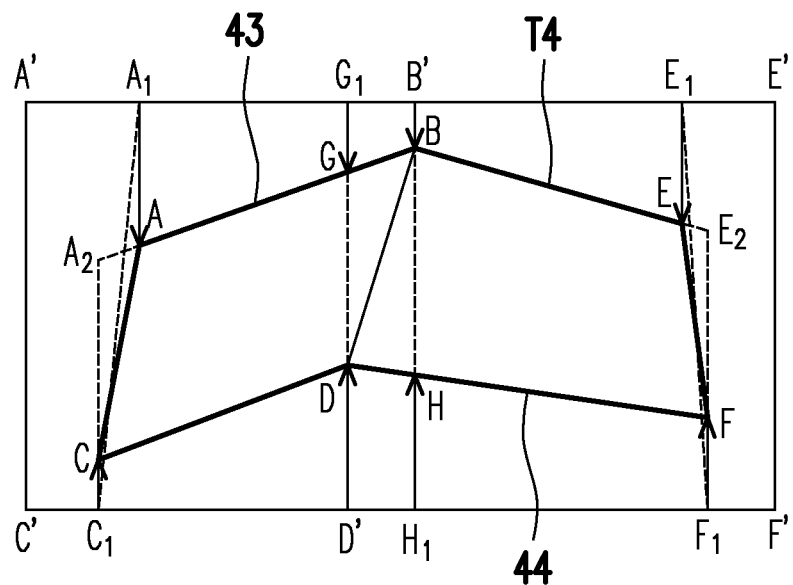
FIG. 5B is a schematic diagram of the vertical scaling process performed when an intersecting line is not along the vertical direction and the horizontal direction according to an embodiment of the disclosure.

To be specific, reference may be made to FIG. 5A and FIG. 5B. FIG. 5A is a schematic diagram of the horizontal scaling process performed when an intersecting line is not along the vertical direction and the horizontal direction according to an embodiment of the disclosure. FIG. 5B is a schematic diagram of the vertical scaling process performed when an intersecting line is not along the vertical direction and the horizontal direction according to an embodiment of the disclosure. Notably, different from the embodiments of FIG. 4A and FIG. 4B, the X components of the target coordinates B and D in FIG. 5A and FIG. 5B are different from each other. That is, in FIG. 5A and FIG. 5B, an intersecting line BD between the two target quadrilaterals forming the target polygon ABEFCD is inclined relative to the vertical direction.

In this case, similar to the foregoing embodiments, the image processing circuit 110 may obtain coordinates B' and D' according to a predetermined image boundary A'E'F'C' and the X components of the target coordinates B and D, and obtain the plurality of first trapezoidal boundaries $A_1B'D'C_1$ and $B'E_1F_1D'$, to perform the horizontal scaling process according to the first trapezoidal boundaries $A_1B'D'C_1$ and $B'E_1F_1D'$ and obtain a trapezoidal image block T3.

Particularly, when the intersecting line BD is not perpendicular to bottom edges of the plurality of first trapezoidal boundaries $A_1B'D'C_1$ and $B'E_1F_1D'$, the image processing circuit 110 obtains a first edge middle segment GB of a first edge 43 of the target polygon and a second edge middle segment DH of a second edge 44 of the target polygon according to two of the plurality of target vertexes (i.e., the target coordinates B and D). To be specific, the image processing circuit 110 obtains the coordinate G on the first edge 43 and the coordinate H on the second edge 44 according to the X components of the two target coordinates B and D on the intersecting line BD, and thereby obtain the first edge middle segment GB and the second edge middle segment DH. The X component of the target coordinate B is the same as an X component of coordinate H. Similarly, the X component of the target coordinate D is the same as an X component of coordinate G.

Then, similar to the foregoing embodiments, the image processing circuit 110 may reduce one second image portion (i.e., a pixel set within a boundary $A_1G_1C_1D'$) of the trapezoidal image block T3 into a sub-target image block corresponding to a boundary AGDC through the vertical scaling process. Besides, the image processing circuit 110 may reduce another second image portion (i.e., a pixel set within a boundary $B'E_1F_1H_1$) of the trapezoidal image block T3 into a sub-target image block corresponding to a boundary BEFH through the vertical scaling process.

Notably, according to the coordinate position of the first edge middle segment GB and the coordinate position of the second edge middle segment DH, the image processing circuit 110 may perform the vertical scaling process (i.e., the second direction scaling process) on the other (i.e., a pixel set within a boundary $G_1B'H_1D'$) of the plurality of second image portions to generate the other sub-target image block corresponding to a boundary GBHD. It can be accordingly know that in the example of FIG. 5B, a target image block T4 includes three sub-target image blocks respectively corresponding to the boundaries GBHD, BEFH, and AGDC. Accordingly, even when an inclined ridgeline or an inclined valley line is present on the projection surface, the embodiments of the disclosure may still realize image pre-deformation through the image scaling process, so that the projection picture generated by the projection device 100 is not distorted.

Notably, in different embodiments, the above-mentioned relevant functions of the image processing circuit 110 may be realized into software, firmware, or hardware through general programming languages (e.g., C or C++), hardware description languages (e.g., Verilog HDL or VHDL), or other appropriate programming languages. The software (or firmware) that may perform the relevant functions may be configured as any known computer-accessible media, such as magnetic tapes, semiconductor RAM, magnetic disks, or compact disks (e.g., CD-ROM or DVD-ROM). The software (or firmware) may be stored in accessible media (e.g., memory) of the computer, so that the processor of the computer may access/execute the programming codes of the software (or firmware) to perform the relevant functions.

In summary of the foregoing, in the embodiments of the disclosure, the projection device may realize image pre-deformation through the horizontal scaling process and the vertical scaling process, and then project the result image generated from the image scaling process onto the projection surface, so that the viewer may view the undistorted projection picture on the projection surface. In the case where the target vertexes are present, the embodiments of the disclosure may realize image pre-deformation that is efficient and easy to implement through the image scaling process. Moreover, compared with realizing image pre-deformation according to the perspective transformation relationship, the embodiments of the disclosure may greatly reduce the computational complexity. Accordingly, even when one or more ridgelines or valley lines are present on the projection surface, the projected image viewed by the viewer is the corrected result in the absence of distortion.

Finally, the foregoing embodiments are only used to explain, instead of limiting, the technical solutions of the disclosure. Although the disclosure has been described in detail with reference to the foregoing embodiments, people having ordinary skill in the art should understand that the technical solutions recited in the foregoing embodiments may still be modified, or that some or all technical features therein may be equivalently replaced. However, the nature of the corresponding technical solutions so modified or replaced does not depart from the scope of the technical solutions of the embodiments of the disclosure.

What is claimed is:

1. A projection picture correction method adapted for a projection device, comprising:
  obtaining a plurality of target coordinates of a plurality of target vertexes based on a plurality of planes of a projection surface when a projection device performs projection toward the projection surface, wherein the plurality of planes are not coplanar with each other, and the plurality of target vertexes form a target polygon;
  performing a first direction scaling process respectively on a plurality of first image portions of an original rectangular image and generating a trapezoidal image block, wherein the step of performing the first direction scaling process respectively on the plurality of first image portions of the original rectangular image and generating the trapezoidal image block comprises:
    obtaining a plurality of first trapezoidal boundaries respectively corresponding to the plurality of first image portions according to a predetermined image boundary and a first coordinate component of each of the plurality of target coordinates; and performing the first direction scaling process on the plurality of first image portions respectively according to the plurality of first trapezoidal boundaries and generating the plurality of second image portions, wherein the trapezoidal image block comprises the plurality of second image portions;

performing a second direction scaling process respectively on a plurality of second image portions of the trapezoidal image block and generating a target image block aligned with the target polygon, wherein the step of performing the second direction scaling process respectively on the plurality of second image portions of the trapezoidal image block and generating the target image block aligned with the target polygon comprises:

respectively extending two edges of the target polygon until the two edges intersect two reference line segments and obtaining two second trapezoidal boundaries, wherein a bottom edge of the trapezoidal image block is perpendicular to bottom edges of the two second trapezoidal boundaries; and performing the second direction scaling process on two of the plurality of second image portions respectively according to the two second trapezoidal boundaries to generate two sub-target image blocks, wherein the target image block comprises the two sub-target image blocks; and projecting an output image comprising the target image block onto the projection surface.

2. The projection picture correction method according to claim 1, wherein the target polygon comprises at least two target quadrilaterals intersecting in an intersecting line, and when the projection device projects the output image, the intersecting line is overlapped with a ridgeline or a valley line on the projection surface.

3. The projection picture correction method according to claim 1, wherein the target polygon comprises at least two target quadrilaterals intersecting in an intersecting line, and the step of performing the second direction scaling process respectively on the plurality of second image portions of the trapezoidal image block and generating the target image block aligned with the target polygon further comprises:

obtaining a first edge middle segment of a first edge of the target polygon and a second edge middle segment of a second edge of the target polygon according to two of the plurality of target coordinates when the intersecting line is not perpendicular to bottom edges of plurality of first trapezoidal boundaries; and performing the second direction scaling process on another of the plurality of second image portions to generate another sub-target image block according to a coordinate position of the first edge middle segment and a coordinate position of the second edge middle segment, wherein the target image block comprises the another sub-target image block.

4. The projection picture correction method according to claim 1, wherein when the first direction scaling process is a horizontal scaling process, the second direction scaling process is a vertical scaling process; and when the first direction scaling process is a vertical scaling process, the second direction scaling process is a horizontal scaling process.

5. The projection picture correction method according to claim 1, wherein the output image comprises the target image block and a background block surrounding the target image block, the projection device projects the target image block and the background block onto the projection surface, and the background block is a black block.

6. A projection device, comprising:
a projection module; and
an image processing circuit configured to:
obtain a plurality of target coordinates of a plurality of target vertexes based on a plurality of planes of a projection surface when the projection module performs projection toward the projection surface, wherein the plurality of planes are not coplanar with each other, and the plurality of target vertexes form a target polygon;

perform a first direction scaling process respectively on a plurality of first image portions of an original rectangular image and generate a trapezoidal image block, wherein the image processing circuit is further configured to:

obtain a plurality of first trapezoidal boundaries respectively corresponding to the plurality of first image portions according to a predetermined image boundary and a first coordinate component of each of the plurality of target coordinates; and perform the first direction scaling process on the plurality of first image portions respectively according to the plurality of first trapezoidal boundaries and generate a plurality of second image portions, wherein the plurality of second image portions form the trapezoidal image block; and perform a second direction scaling process respectively on a plurality of second image portions of the trapezoidal image block and generate a target image block aligned with the target polygon, wherein the image processing circuit is further configured to:

respectively extend two edges of the target polygon until the two edges intersect two reference line segments and obtain two second trapezoidal boundaries, wherein a bottom edge of the trapezoidal image block is perpendicular to bottom edges of the two second trapezoidal boundaries; and perform the second direction scaling process on two of the plurality of second image portions respectively according to the two second trapezoidal boundaries to generate two sub-target image blocks, wherein the target image block comprises the two sub-target image blocks, wherein the projection module projects an output image comprising the target image block onto the projection surface.

7. The projection device according to claim 6, wherein the target polygon comprises at least two target quadrilaterals intersecting in an intersecting line, and when the projection device projects the output image, the intersecting line is overlapped with a ridgeline or a valley line on the projection surface.

8. The projection device according to claim 6, wherein the target polygon comprises at least two target quadrilaterals intersecting in an intersecting line, and the image processing circuit is further configured to:

obtain a first edge middle segment of a first edge of the target polygon and a second edge middle segment of a second edge of the target polygon according to two of the plurality of target coordinates when the intersecting line is not perpendicular to bottom edges of plurality of first trapezoidal boundaries; and perform the second direction scaling process on another of the plurality of second image portions to generate another sub-target image block according to a coordinate position of the first edge middle segment and a coordinate position of the second edge middle segment, wherein the target image block comprises the another sub-target image block.

9. The projection device according to claim 6, wherein when the first direction scaling process is a horizontal scaling process, the second direction scaling process is a vertical scaling process; and when the first direction scaling process is a vertical scaling process, the second direction scaling process is a horizontal scaling process.

10. The projection device according to claim 6, wherein the output image comprises the target image block and a background block surrounding the target image block, the projection device projects the target image block and the background block onto the projection surface, and the background block is a black block.

* * * * *